(12) United States Patent
Dellock et al.

(10) Patent No.: US 10,507,768 B2
(45) Date of Patent: Dec. 17, 2019

(54) REMOVABLE ROOF RACK SYSTEM AND REMOVABLE CROSSBAR APPARATUS FOR THAT REMOVABLE ROOF RACK SYSTEM

(71) Applicant: FORD GLOBAL TECHNOLOGIES, LLC, Dearborn, MI (US)

(72) Inventors: Paul Kenneth Dellock, Northville, MI (US); David Brian Glickman, Southfield, MI (US); Stuart C. Salter, White Lake, MI (US); Roger Petrey, Rochester Hils, MI (US); Harry Lobo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 15/910,631

(22) Filed: Mar. 2, 2018

(65) Prior Publication Data
US 2019/0270414 A1    Sep. 5, 2019

(51) Int. Cl.
*B60R 9/00* (2006.01)
*B60R 9/058* (2006.01)
*F16B 7/04* (2006.01)

(52) U.S. Cl.
CPC ............ *B60R 9/058* (2013.01); *F16B 7/0473* (2013.01)

(58) Field of Classification Search
CPC ......... B60R 9/058; E05B 73/00; E05B 85/06; F16B 21/125; F16B 7/0473
USPC ........................................................ 224/315
See application file for complete search history.

(56) References Cited

U.S. PATENT DOCUMENTS

| | | |
|---|---|---|
| 5,794,826 A | 8/1998 | Cronce et al. |
| 6,216,928 B1 | 4/2001 | Blankenburg et al. |
| 7,458,490 B2 | 12/2008 | Klinkman et al. |
| 7,721,925 B1 | 5/2010 | Graffy et al. |
| 8,028,875 B2 | 10/2011 | Kmita et al. |
| 8,348,111 B2 | 1/2013 | Heuchert et al. |
| 8,720,761 B2 | 5/2014 | Binder et al. |
| 8,960,734 B2 | 2/2015 | Camp |
| 9,371,041 B2 | 6/2016 | Almhill et al. |
| 9,718,410 B2 | 8/2017 | Cropley et al. |
| 2015/0152665 A1 | 6/2015 | Camp |

FOREIGN PATENT DOCUMENTS

| | | |
|---|---|---|
| CN | 105083139 B | 1/2013 |
| CN | 204161225 U | 2/2015 |
| GB | 2488771 A | 9/2012 |

OTHER PUBLICATIONS

English Machine Translation of CN105083139B.
English Machine Translation of CN204161225U.
(Continued)

*Primary Examiner* — Peter N Helvey
(74) *Attorney, Agent, or Firm* — Jason Rogers; Vichit Chea; King & Schickli, PLLC

(57) ABSTRACT

A removable roof rack system includes a first roof rail having a first guide track, a second roof rail having a second guide track and a crossbar having a first end and a second end. The removable roof rack system also includes a first slide received in the first guide track, a second slide received in the second guide track and a first releasable latch assembly connecting the first end to the first slide and a second releasable latch assembly connecting the second end to the second slide.

16 Claims, 10 Drawing Sheets

(56) References Cited

OTHER PUBLICATIONS

"Removable Mount REX Series Roof Rack for Hyundai Santa Fe with Roof Rails"; ROLA; https://www.amazon.com/59766-Removable-Mount-Hyundai-Santa/dp/B009QRWHZO; p. 1 of 1.
"Rhino-Rack Roof Rail Roof Rack for Ford Everest"; L.A. Car Accessories; http://www.lacaraccessories.com/online-store/4x4-accessories/rhino-rack-cross-bar/rhino-rack-roof-rail-roof-rack-for-ford-everest-detail.html; pp. 1-3.
"Pacific Steel Roof Bars for Vauxhall Zafira MK II 2005-2011 without Roof Rails"; Vauxhall Zafira; https://www.ebay.ie/itm/Pacific-Steel-Roof-bars-for-Vauxhall-Zafira-Mk-II-2005-2011-Without-Roof-Rails/361376555207?hash=item5423b8a0c7:g:oicAAOSwH05ZtoRS; pp. 1-3.

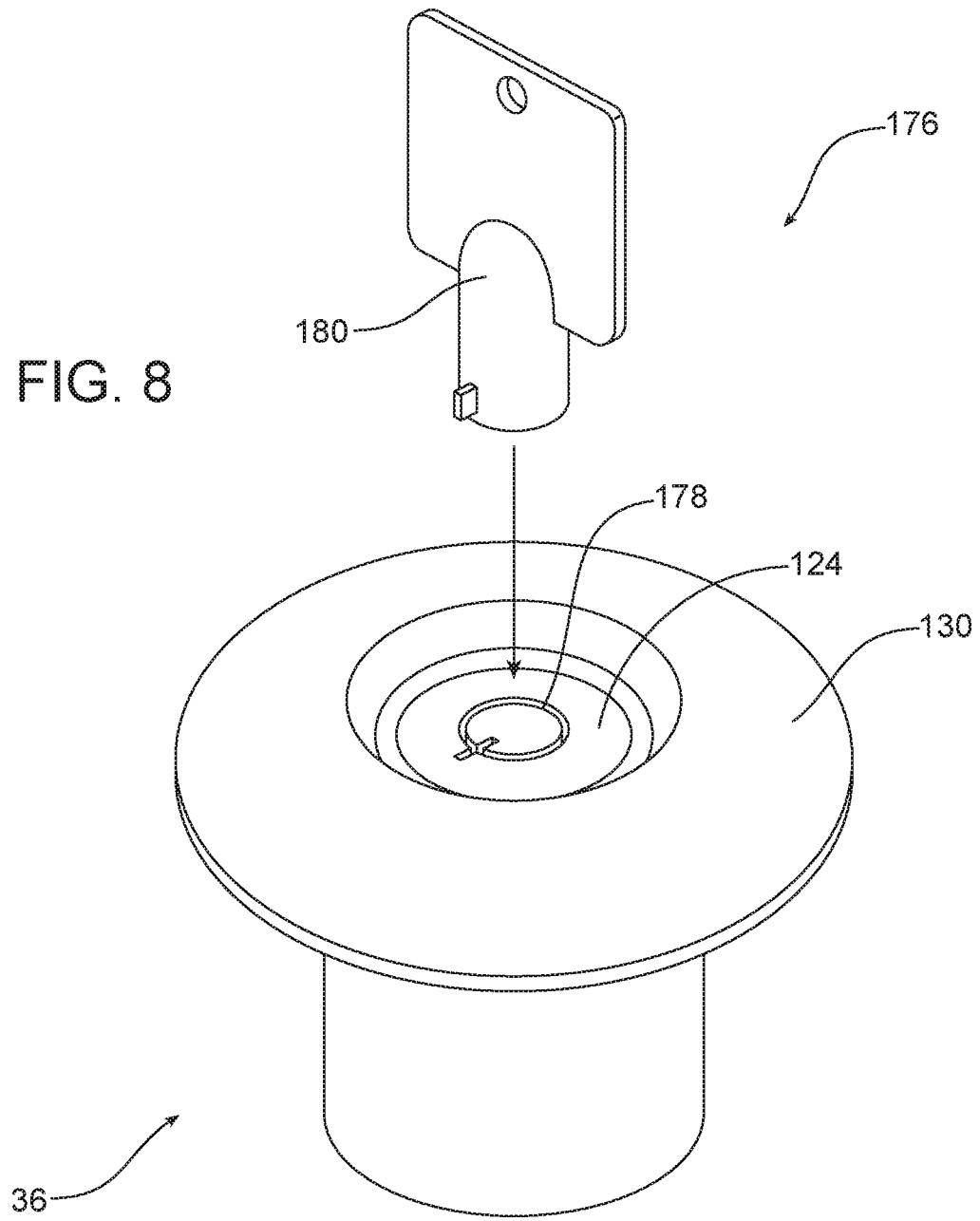

REMOVABLE ROOF RACK SYSTEM AND REMOVABLE CROSSBAR APPARATUS FOR THAT REMOVABLE ROOF RACK SYSTEM

TECHNICAL FIELD

This document relates generally to the motor vehicle equipment field and, more particularly, to a removable roof rack system as well as to a removable crossbar apparatus for that removable roof rack system.

BACKGROUND

Many motor vehicle owners want their motor vehicle to be equipped with a roof rack system which allows one to more easily transport cargo on the roof of a motor vehicle. Ideally, each roof rack system of the roof rack is removable so that they may be removed from the roof of the motor vehicle when not in use. This allows the motor vehicle owner to lessen aerodynamic drag of the vehicle and thereby improve fuel economy.

This document relates to a new and improved removable crossbar apparatus as well as to a removable roof rack system that allows a motor vehicle owner to conveniently and efficiently secure a crossbar and/or roof rack system to and remove a crossbar and/or roof rack system from the roof of a motor vehicle.

SUMMARY

In accordance with the purposes and benefits described herein, a removable roof rack system is provided for a motor vehicle. That removable roof rack system is easily removable from the motor vehicle. The roof rack system comprises: a) a first roof rail having a first guide track; b) a second roof rail having a second guide track; c) a crossbar having a first end and a second end; d) a first slide received in the first guide track; e) a second slide received in the second guide track; f) a first releasable latch assembly connecting the first end of the crossbar to the first slide; and g) a second releasable latch assembly connecting the second end of the crossbar to the second slide.

The removable roof rack system may further include a third releasable latch assembly connecting a first foot of the first roof rail to the motor vehicle. The removable roof rack system may also include a fourth releasable latch assembly connecting a second foot of the first roof rail to the motor vehicle.

Still further, the removable roof rack system may include a fifth releasable latch assembly connecting a third foot of the second roof rail to the motor vehicle and a sixth releasable latch assembly connecting a fourth foot of the second roof rail to the motor vehicle.

The first releasable latch assembly may include a first latch mechanism carried on the first end of the crossbar and a first locking pin carried on the first slide. The second releasable latch assembly may include a second latch mechanism carried on the second end of the crossbar and a second locking pin carried on the second slide.

Still further, the first releasable latch assembly may include a first push button actuator to release the first latch mechanism from the first locking pin and separate the crossbar from the first slide. Similarly, the second releasable latch assembly may include a second push button actuator to release the second latch mechanism from the second locking pin and separate the crossbar from the second slide.

The third releasable latch assembly may include a third latch mechanism carried on the first foot, a third locking pin carried on the motor vehicle and a third push button actuator to release the third latch mechanism from the third locking pin and separate the first roof rail from the motor vehicle. The fourth releasable latch assembly may include a fourth latch mechanism carried on the second foot, a fourth locking pin carried on the motor vehicle and a fourth push button actuator to release to the fourth latch mechanism from the fourth locking pin and separate the first roof rail from the motor vehicle.

The fifth releasable latch assembly may include a fifth latch mechanism carried on the third foot, a fifth locking pin carried on the motor vehicle and a fifth push button actuator to release the fifth latch mechanism from the fifth locking pin and separate the second roof rail from the motor vehicle. The sixth releasable latch assembly may include a sixth latch mechanism carried on the fourth foot, a sixth locking pin carried on the motor vehicle and a sixth push button actuator to release the sixth latch mechanism from the sixth locking pin and separate the second roof rail from the motor vehicle.

In accordance with an additional aspect, a new and improved removable crossbar apparatus is incorporated into the roof rack system. That apparatus comprises a crossbar having a first end and a second end, a first slide, a second slide, a first releasable latch assembly connecting the first end of the crossbar to the first slide and a second releasable latch assembly connecting the second end of the crossbar to the second slide.

The first releasable latch assembly may include a first latch mechanism carried on the first end of the crossbar and a first locking pin carried on the first slide. Similarly, the second releasable latch assembly may include a second latch mechanism carried on the second end of the crossbar and a second locking pin carried on the second slide.

The first releasable latch assembly may include a first push button actuator to release the first latch mechanism from the first locking pin and separate the crossbar from the first slide. Similarly, the second releasable latch assembly may include a second push button actuator to release the second latch mechanism from the second locking pin and separate the crossbar from the second slide.

The first locking pin may be secured by a pivot to the first slide. This pivot functions to make the first locking pin displaceable between a storage position and a deployed position. The first slide may include a locking pin receiver. The first locking pin may nest in the locking pin receiver when the first locking pin is in the storage position.

In the following description, there are shown and described several preferred embodiments of the removable roof system and the removable crossbar apparatus for that system. As it should be realized, the removable roof rack system and removable crossbar apparatus are capable of other, different embodiments and their several details are capable of modification in various, obvious aspects all without departing from the removable roof rack system and removable crossbar apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the removable roof rack system and removable crossbar apparatus and together with the description serve to explain certain principles thereof.

FIG. 4b is a detailed perspective view of the spring loaded guide shoes also shown in FIG. 4a.

FIG. 8 is a detailed perspective view of an alternative embodiment wherein the latch mechanism includes a locking feature.

Reference will now be made in detail to the present preferred embodiments of the removable roof rack system and crossbar apparatus, examples of which are illustrated in the accompanying drawing figures.

DETAILED DESCRIPTION

Figure 1:
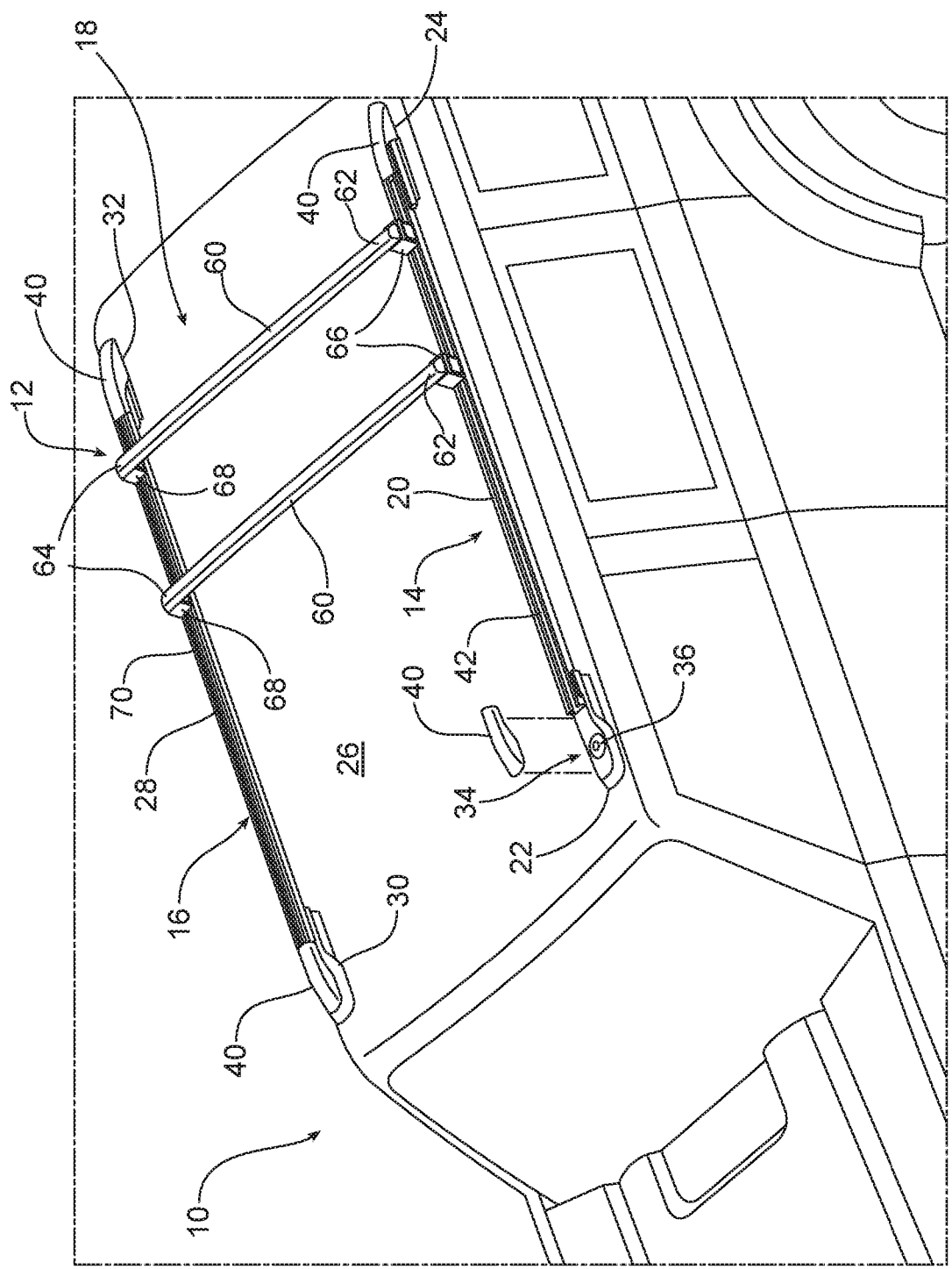
FIG. 1 is a perspective view of a motor vehicle equipped with the removable roof rack system.

Reference is now made to FIG. 1 illustrating a motor vehicle equipped with the new and improved removable roof rack system 12. That removable roof rack system 12 includes a first removable roof rail assembly 14, a second removable roof rail assembly 16 and two removable crossbar apparatus 18 that are adjustable along the length of the removable roof rail assemblies 14, 16 in a manner described in greater detail below.

The first removable roof rail assembly 14 includes a first roof rail 20 having a first foot 22 at one end and a second foot 24 at the opposite end that engage the roof 26 of the motor vehicle 10. Similarly, the second removable roof rail assembly 16 includes a second roof rail 28 having a third foot 30 at a third end and a fourth foot 32 at a fourth end for engaging the roof 26 of the motor vehicle 10. A latch assembly 34 releasably secures each foot 22, 24, 30, 32 and, therefore, each roof rail 20, 28 to the roof 26 of the motor vehicle 10. As described in greater detail below, each latch assembly 34 includes a latch mechanism 36 and a cooperating locking pin 38 (see FIGS. 6 and 7).

Each latch mechanism 36 may be concealed inside a removable cover 40 of the related roof rail 20, 28. In FIG. 1, the removable cover 40 at the first foot 22 is removed to expose the latch assembly 34 of that foot to view. The other removable covers 40 on the feet 24, 30, and 32 are secured in place to conceal the latch assemblies 36 at those feet. Each cover 40 may be connected to the associated foot 22, 24, 30, 32 by resilient snap clips or other appropriate means (not shown).

Figure 2:
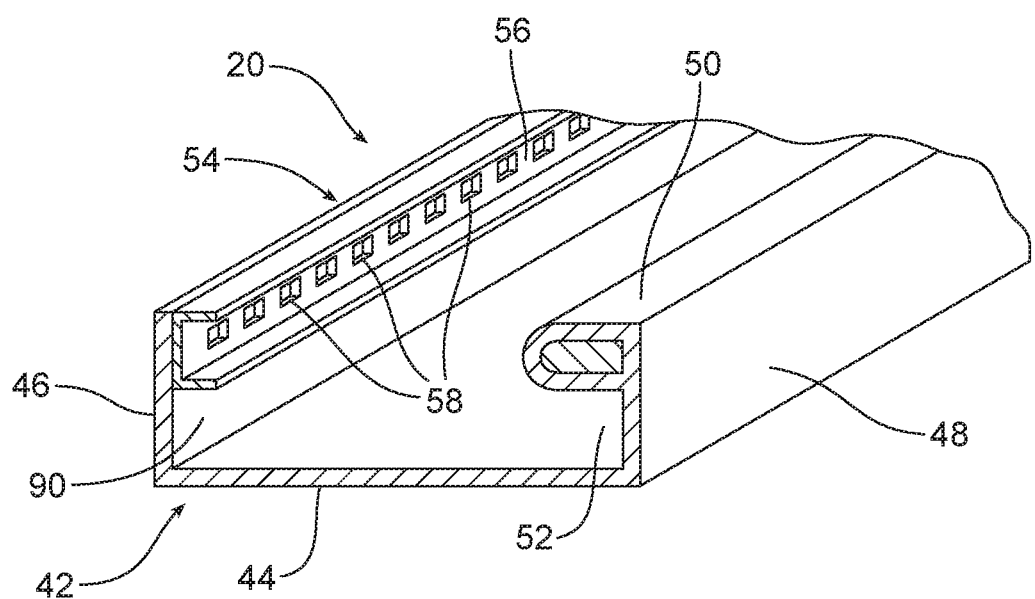
FIG. 2 is detailed perspective view of a roof rail of that removable roof rack system.
Figure 3:
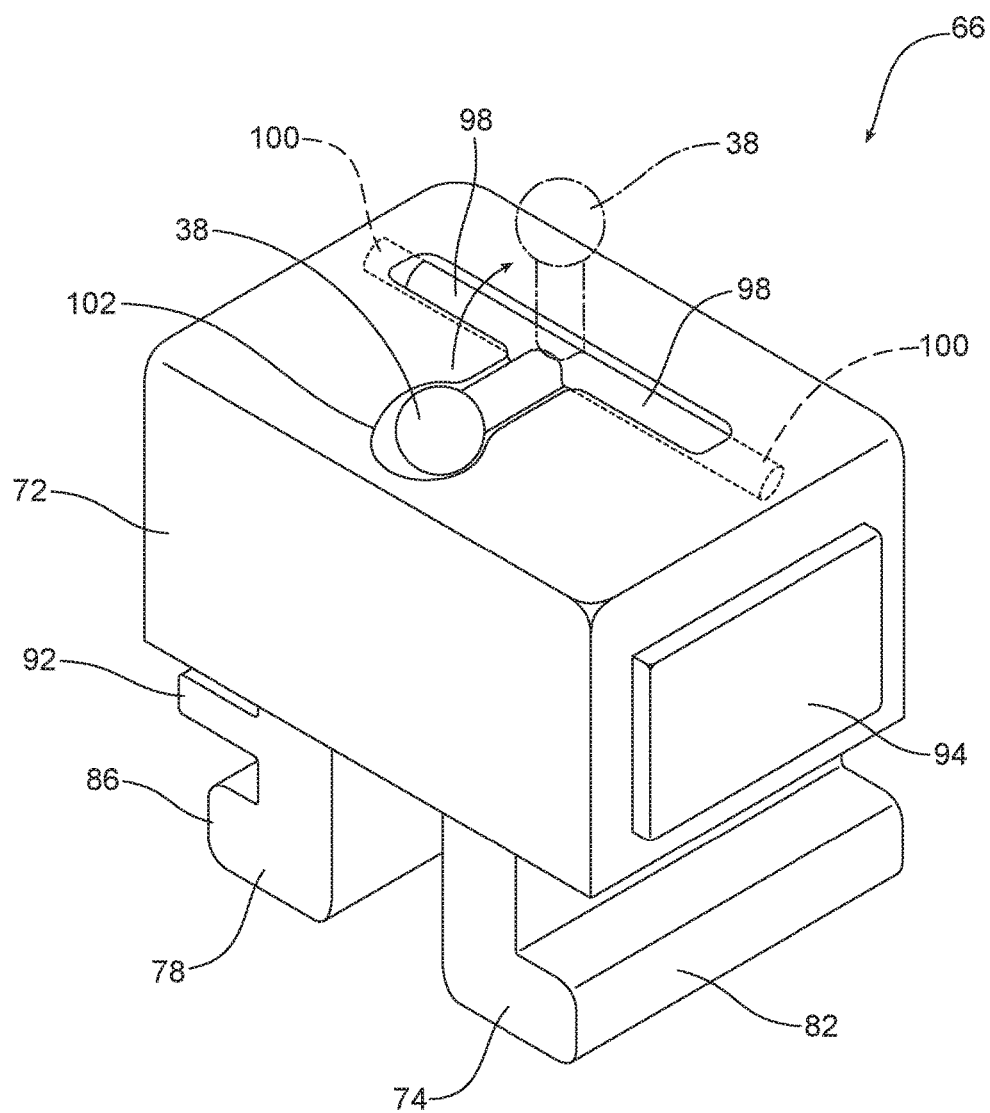
FIG. 3 is a detailed perspective view of a slide of the type that is received in the roof rail illustrated in FIG. 2.

Reference is now made to FIG. 2 which is a detailed perspective illustration of the first roof rail 20. That first roof rail 20 includes a first guide track 42 in the form of a channel defined by a bottom wall 44, an inboard upstanding sidewall 46 and an outboard upstanding sidewall 48. The outboard upstanding sidewall 48 includes a retaining shoulder 50. A continuous slot 52 is defined between the bottom wall 44 and the retaining shoulder 50. A positioning rack 54 is carried on the channel-facing side of the inboard upstanding sidewall 46 so as to overlie the bottom wall 44. The positioning rack 54 comprises a channel 56 that opens toward the retaining shoulder 50 and a plurality of apertures 58 provided along the channel.

The second roof rail 28 includes a structure that is a mirror image to the first roof rail 20 illustrated in FIG. 2.

Reference is now made to FIGS. 1, 2, 3, 4, 5a and 5b which illustrate one crossbar apparatus 18 in detail. Each crossbar apparatus 18 includes a crossbar 60 having a first end 62 and a second end 64. A first releasable latch assembly 34 connects the first end 62 of the crossbar 60 to a first slide 66. A second releasable latch assembly 34 connects the second end 64 of the crossbar 60 to a second slide 68. As will become apparent from the following description, the first slide 66 is received in and slides along the first guide track 42 of the first roof rail 20. The second slide 68 is received in and slides along the second guide track 70 in the second roof rail 28.

Reference is now made to FIGS. 3, 4a, 4b, 5a and 5b illustrating the first slide 66 in detail. As shown, the first slide 66 includes a housing 72. A first guide shoe 74 is pivotally secured to the housing 72 by a first pivot pin 76. Similarly, a second guide shoe 78 is pivotally carried on the housing 72 by a second pivot pin 80. In the illustrated embodiment, the first pivot pin 76 and second pivot pin 80 are spaced apart but parallel. The first guide shoe 74 is substantially L-shaped while the second guide shoe 78 is substantially F-shaped. The two guide shoes 74, 78 are both made from a low friction material, such as nylon, that will easily slide in the first guide track 42.

Figure 4A:
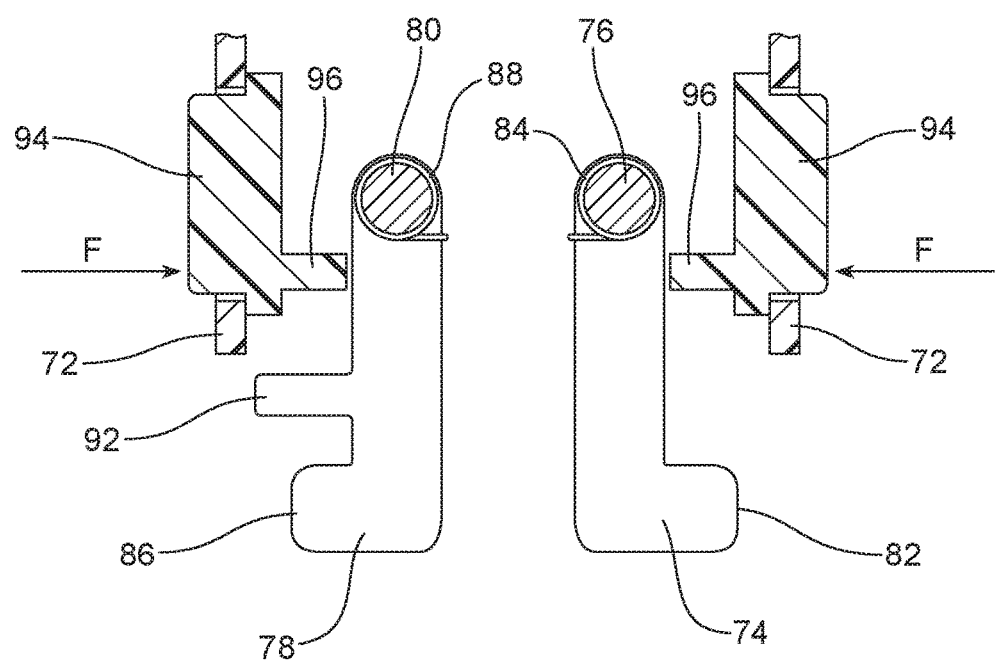
FIG. 4a is a schematic cross-sectional view illustrating a locking feature that secures the slide in a selected position along the guide track of the roof rail illustrated in FIG. 2.
Figure 4B:
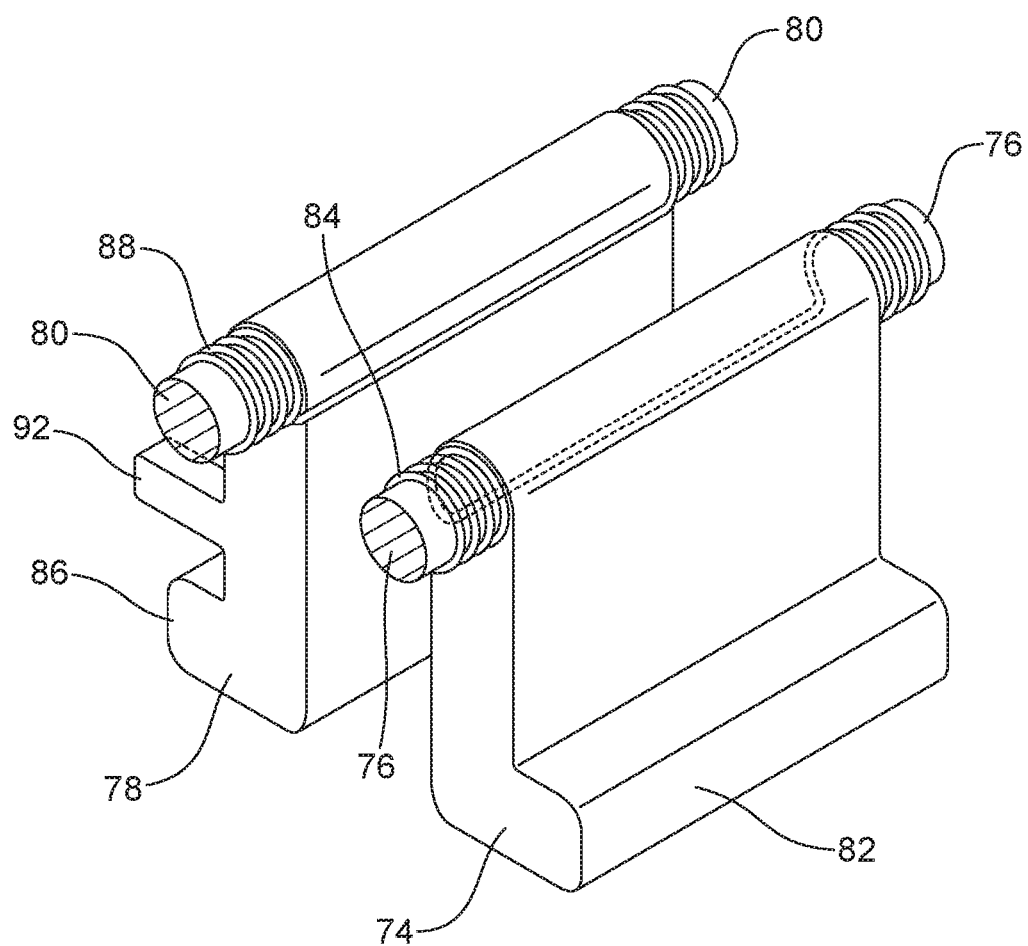
Figure 5A:
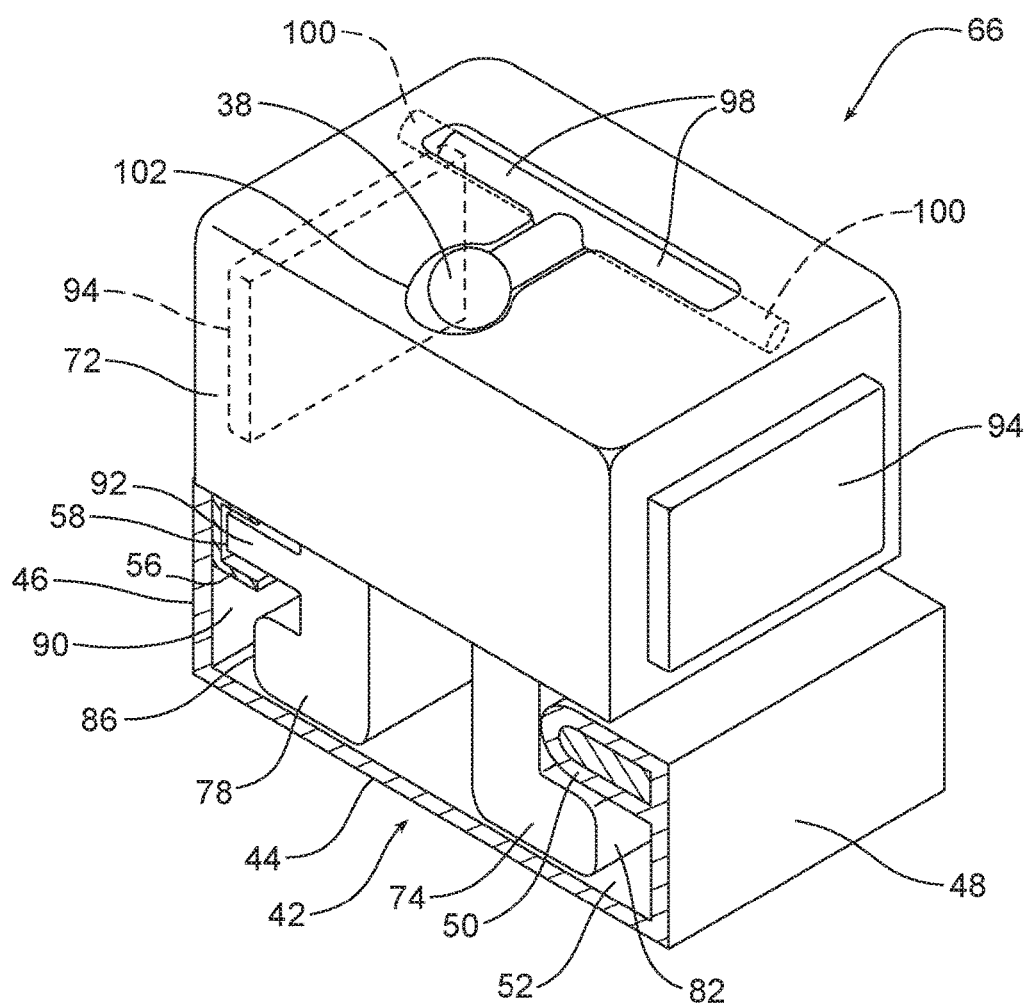
FIGS. 5a and 5b are detailed cross-sectional views illustrating the locking feature of the slide in respective locked and unlocked positions.
Figure 5B:
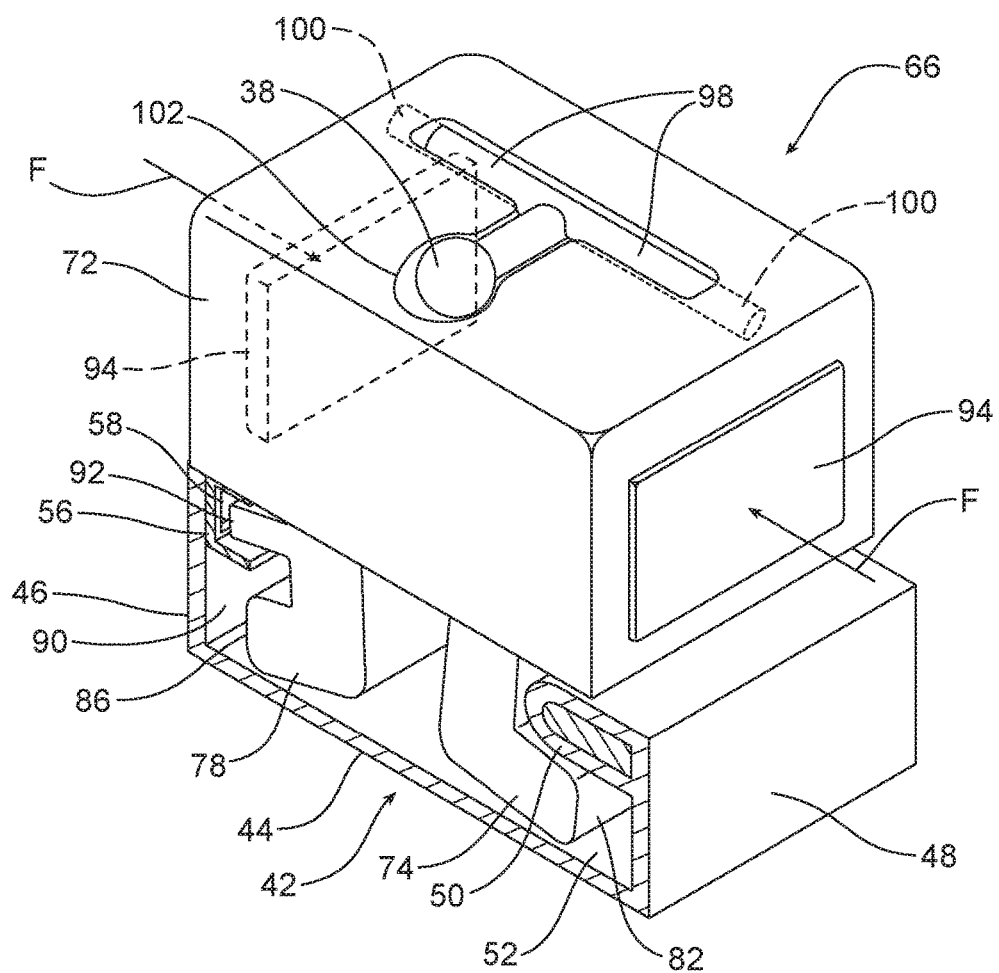

More specifically, as illustrated in FIG. 5a, when the first slide 66 is properly secured and seated in the first guide track 42, the distal end 82 of the first guide shoe 74 is received in the slot 52 beneath the retaining shoulder 50. A first spring 84 biases the first guide shoe 74 outward away from the second guide shoe 78 into engagement in the slot 52. See also FIGS. 4a and 4b.

Similarly, the distal end 86 of the second guide shoe 78 is urged by a second spring 88 into the slot 90 defined by the bottom wall 44, the inboard upstanding sidewall 46 and the positioning rack 54 opposite the slot 52. Here it should be appreciated that the retaining shoulder 50 overlying the distal end 82 of the first guide shoe 74 and the positioning rack 54 overlying the distal end 86 of the second guide shoe 78 function to retain the first slide 66 in the first guide track 42 of the first roof rail 20. A lug 92 carried on the second guide shoe 78 engages in one of the apertures 58 in the positioning rack 54 in order to secure the first slide 66 at a selected position along the longitudinal length of the first roof rail 20. Note particularly FIG. 5a illustrating the lug 92 engaged in one of the apertures 58 of the positioning rack 54.

When one wishes to adjust the longitudinal position of the first slide 66 and, therefore, the crossbar apparatus 18 with respect to the first roof rail 20, one squeezes the opposed actuators 94 on opposite sides of the housing 72 together (note action arrows F in FIG. 4a). The tabs 96 carried on the actuators 94 engage the first and second guide shoes 74, 78 causing them to pivot together against the force of the biasing springs 84, 88 about the pivots 76, 80. This frees the lug 92 from the aperture 58 (see FIG. 5b) and allows the first slide 66 to slide smoothly through the first guide track 42 to a new desired longitudinal position. At that point the operator releases the opposed actuators 94 and the first and second springs 84, 88 again bias the first guide shoe 74 and second guide shoe 78 outwardly until the respective distal ends 82, 86 of the first and second shoes 74, 78 are again fully received in the opposed slots 52, 90 and the lug 92 is again engaged in a different aperture 58 provided in the positioning rack 54 at the newly selected position.

As previously indicated, a latch assembly 34 connects the first end 62 of the crossbar 60 to the first slide 66. More specifically, a latch mechanism 36 is provided at the first end 62 of the crossbar 60 and a cooperating first locking pin 38 is carried on the housing 72 of the first slide 66. More specifically, the locking pin 38 is secured by a pivot 98 received in a trunnion 100 formed in the housing 72. Accordingly, the locking pin 38 is displaceable between a storage position, shown in full line in FIG. 3 wherein locking pin 38 is nested in a locking pin receiver 102 formed in the housing 72 and a deployed position (shown in phantom line) wherein the locking pin projects upwardly from the housing.

While not illustrated, the second slide 68 at the second end 64 of the crossbar 60 is a mirror image structure of the first slide 66.

Figure 6:
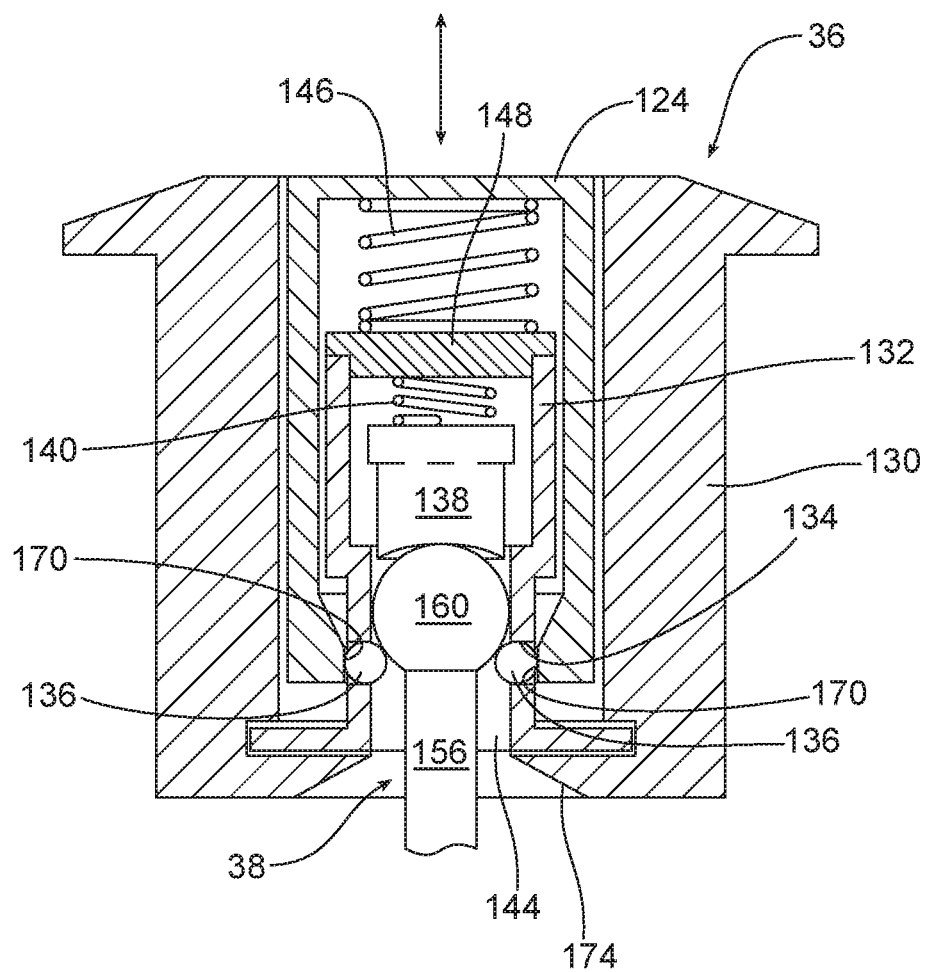
FIG. 6 is a detailed schematic view illustrating the various latch assemblies utilized to secure the roof rails to the motor vehicle and the crossbars to the slides that may be displaced along the roof rails wherein the latch assembly is in the locked or latched condition.
Figure 7:
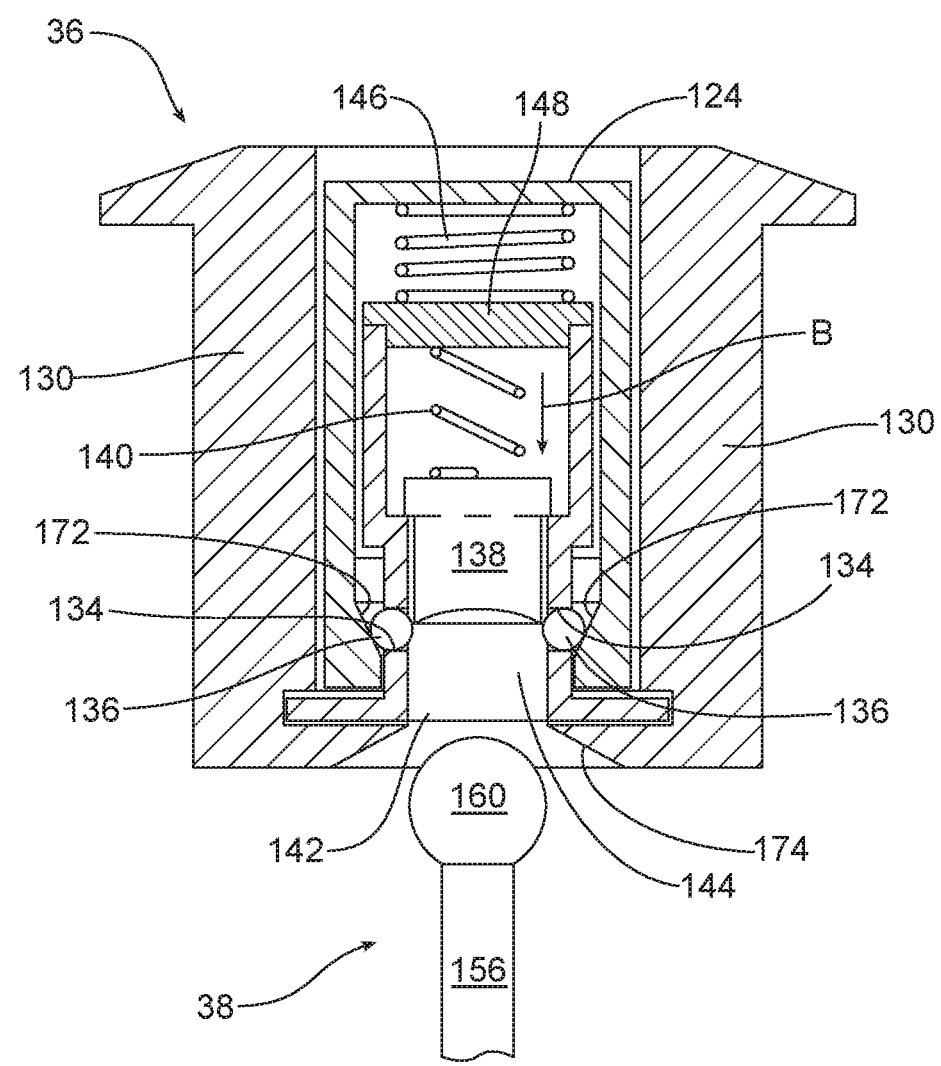
FIG. 7 is a view similar to FIG. 6 but illustrating the latch assembly in the unlocked or unlatched condition.

Reference is now made to FIGS. 6 and 7 which illustrate the latch mechanism 36 and locking pin 38 of each latch assembly 34 in detail in the respective latched condition and unlatched condition. Each latch assembly 34 includes a latch mechanism 36 and a cooperating locking pin 38. In the illustrated embodiment, a latch mechanism 36 is provided at each foot 22, 24, 30, 32 and at each end 62, 64 of each crossbar 60. Cooperating locking pins 38 for these latch mechanisms 36 are secured to the motor vehicle 10 such as by welding to a roof support (not shown) and on the slides 66, 68 that releasably connect each crossbar apparatus 18 to each roof rail 20, 28.

As illustrated in FIGS. 6 and 7, each latch mechanism 36 includes an outer housing 130 that receives the push button actuator 124 and an inner housing 132 received within the push button actuator. A plurality of apertures 134 are aligned and radially arrayed around the inner housing 132. A plurality of retaining balls 136 are freely received in the plurality of apertures 134.

A locking plunger 138 is received in the inner housing 132. A locking plunger spring 140 biases the locking plunger 138 toward the entry opening 142 of a locking pin receiver 144 in the inner housing 132. A return spring 146 extends between the push button actuator and the cap 148 of the inner housing 132. As will be appreciated from the following description, the return spring 146 functions to bias the push button actuator 124 toward a home position that is illustrated in drawing FIG. 6.

The operation of each latch assembly 34 will now be described in detail. As illustrated, each locking pin 38 includes a shank 156 having an enlarged head 160 at a distal end. The locking pins 38 are engaged in each of the cooperative latch mechanisms 36. More specifically, the projecting and enlarged head 160 of each locking pin 38 is received in the locking pin receiver 144 of each latch mechanism 36. The enlarged head 160 is engaged against the locking plunger 138 and captured in the locking pin receiver 144 between the locking plunger 138 and the retaining balls 136 which are held in a position projecting inward against the enlarged head 160 by the bearing surface 170 of the push button actuator 124.

When one wishes to release the latch assemblies 34 to remove a crossbar 60 or a roof rail 20, 28 from the motor vehicle 10, one must press the push button actuator 124 of each of the associated latch mechanisms 36. FIG. 7 illustrates the push button actuator 124 in the depressed position. In this position, the sloped cam surface 172 along the inner wall of the push button actuator 124 is aligned with the retaining balls 136 and the apertures 134. This creates clearance for the outward movement of the retaining balls 136 into the apertures 134 as the locking plunger spring 140 biases the locking plunger 138 in the direction of action arrow B. As the locking pin 38 is withdrawn from the latch mechanism 36 in the direction of action arrow B, the retaining balls 136 are pushed radially outward providing clearance for the enlarged head 160 of the locking pin 38 to pass out of the locking pin receiver 144 thereby freeing the removable roof rail assemblies 14, 16 from the roof 26. Upon release, each push button actuator 124 is returned to the home position illustrated in FIG. 2 by operation of the return spring 146.

When one wishes to again fix a crossbar 60 or a roof rail 20, 28 to the motor vehicle 10, one aligns the component so that the locking pin receivers 144 of the associated latch mechanisms 36 are aligned with the cooperating locking pins 38 used to fix the component in the desired position. The tapered entry 174 provided in the outer housing 130 that converges toward the locking pin receiver 144 aids in the proper aligning of the components. Once aligned, one manipulates the component so as to bring the locking pins 38 into proper engagement with the latch mechanisms 36. Each locking pin 38 is forced against the locking plunger spring 140 until the enlarged head 160 snaps past the retaining balls 136 and is again locked in position.

As illustrated in FIG. 8, one or more of the latch mechanisms 36 that secure each roof rail 20, 28 and each crossbar 60 in position may include a locking feature 176 to prevent theft. As illustrated in FIG. 8, that locking feature 176 may include a key receiver 178 integrated into the push button actuator 124 and a cooperating key 180 configured for receiving and unlocking of the locking feature. When the locking feature 176 is locked, the push button actuator 124 is secured in the home position with the retaining balls 136 biased radially inward to securely hold the enlarged head 160 of the locking pin 38 in the locking pin receiver 144 of the latch mechanism 36 thereby preventing theft of the removable roof rail assembly 14, 16. Such a push button locking feature 176 is known in the art.

The foregoing has been presented for purposes of illustration and description. It is not intended to be exhaustive or to limit the embodiments to the precise form disclosed. Obvious modifications and variations are possible in light of the above teachings. For example, the removable roof rail assemblies 14, 16 could each be a part in assembly (PIA) to a removable roof panel: that is, integrated to a roof panel. All such modifications and variations are within the scope of the appended claims when interpreted in accordance with the breadth to which they are fairly, legally and equitably entitled.

What is claimed:
1. An apparatus, comprising:
a crossbar having a first end and a second end;
a first slide;
a second slide;
a first releasable latch assembly connecting said first end to said first slide, said first releasable latch assembly including a first latch mechanism carried on said first end of said crossbar and a first locking pin carried on said first slide; and
a second releasable latch assembly connecting said second end to said second slide, said second releasable latch assembly including a second latch mechanism carried on said second end of said crossbar and a second locking pin carried on said second slide.

2. The apparatus of claim 1, wherein said first releasable latch assembly includes a first push button actuator to release said first latch mechanism from said first locking pin and separate said crossbar from said first slide.

3. The apparatus of claim 2, wherein said second releasable latch assembly includes a second push button actuator to release said second latch mechanism from said second locking pin and separate said crossbar from said second slide.

4. The apparatus of claim 3, wherein said first locking pin is secured by a pivot to said first slide and is displaceable between a storage position and a deployed position.

5. The apparatus of claim 4, wherein said first slide includes a locking pin receiver, said first locking pin nesting in said locking pin receiver when in said storage position.

6. A roof rack system, comprising:
a first roof rail having a first guide track;
a second roof rail having a second guide track;
a crossbar having a first end and a second end;
a first slide received in said first guide track;
a second slide received in said second guide track;
a first releasable latch assembly connecting said first end to said first slide, said first releasable latch assembly including a first latch mechanism carried on said first end of said crossbar and a first locking pin carried on said first slide; and
a second releasable latch assembly connecting said second end to said second slide, said second releasable latch assembly including a second latch mechanism carried on said second end of said crossbar and a second locking pin carried on said second slide.

7. The roof rack system of claim 6, including a third releasable latch assembly connecting a first foot of said first roof rail to a motor vehicle.

8. The roof rack system of claim 7, including a fourth releasable latch assembly connecting a second foot of said first roof rail to said motor vehicle.

9. The roof rack system of claim 8, including a fifth releasable latch assembly connecting a third foot of said second roof rail to said motor vehicle.

10. The roof rack system of claim 9, including a sixth releasable latch assembly connecting a fourth foot of said second roof rail to said motor vehicle.

11. The roof rack system of claim 10, wherein said first releasable latch assembly includes a first push button actuator to release said first latch mechanism from said first locking pin and separate said crossbar from said first slide.

12. The roof rack system of claim 11, wherein said second releasable latch assembly includes a second push button actuator to release said second latch mechanism from said second locking pin and separate said crossbar from said second slide.

13. The roof rack system of claim 12, wherein said third releasable latch assembly includes a third latch mechanism carried on said first foot, a third locking pin carried on said motor vehicle and a third push button actuator to release said third latch mechanism from said third locking pin and separate said first roof rail from said motor vehicle.

14. The roof rack system of claim 13, wherein said fourth releasable latch assembly includes a fourth latch mechanism carried on said second foot, a fourth locking pin carried on said motor vehicle and fourth push button actuator to release said fourth latch mechanism from said fourth locking pin and separate said first roof rail from said motor vehicle.

15. The roof rack system of claim 14, wherein said fifth releasable latch assembly includes a fifth latch mechanism carried on said third foot, a fifth locking pin carried on said motor vehicle and a fifth push button actuator to release said fifth latch mechanism from said fifth locking pin and separate said second roof rail from said motor vehicle.

16. The roof rack system of claim 15, wherein said sixth releasable latch assembly includes a sixth latch mechanism carried on said fourth foot, a sixth locking pin carried on said motor vehicle and a sixth push button actuator to release said sixth latch mechanism from said sixth locking pin and separate said second roof rail from said motor vehicle.

* * * * *